Jan. 21, 1964     C. E. STOUT, JR     3,118,528
ARTICLE UNLOADING MECHANISM
Filed Oct. 16, 1961     4 Sheets-Sheet 1
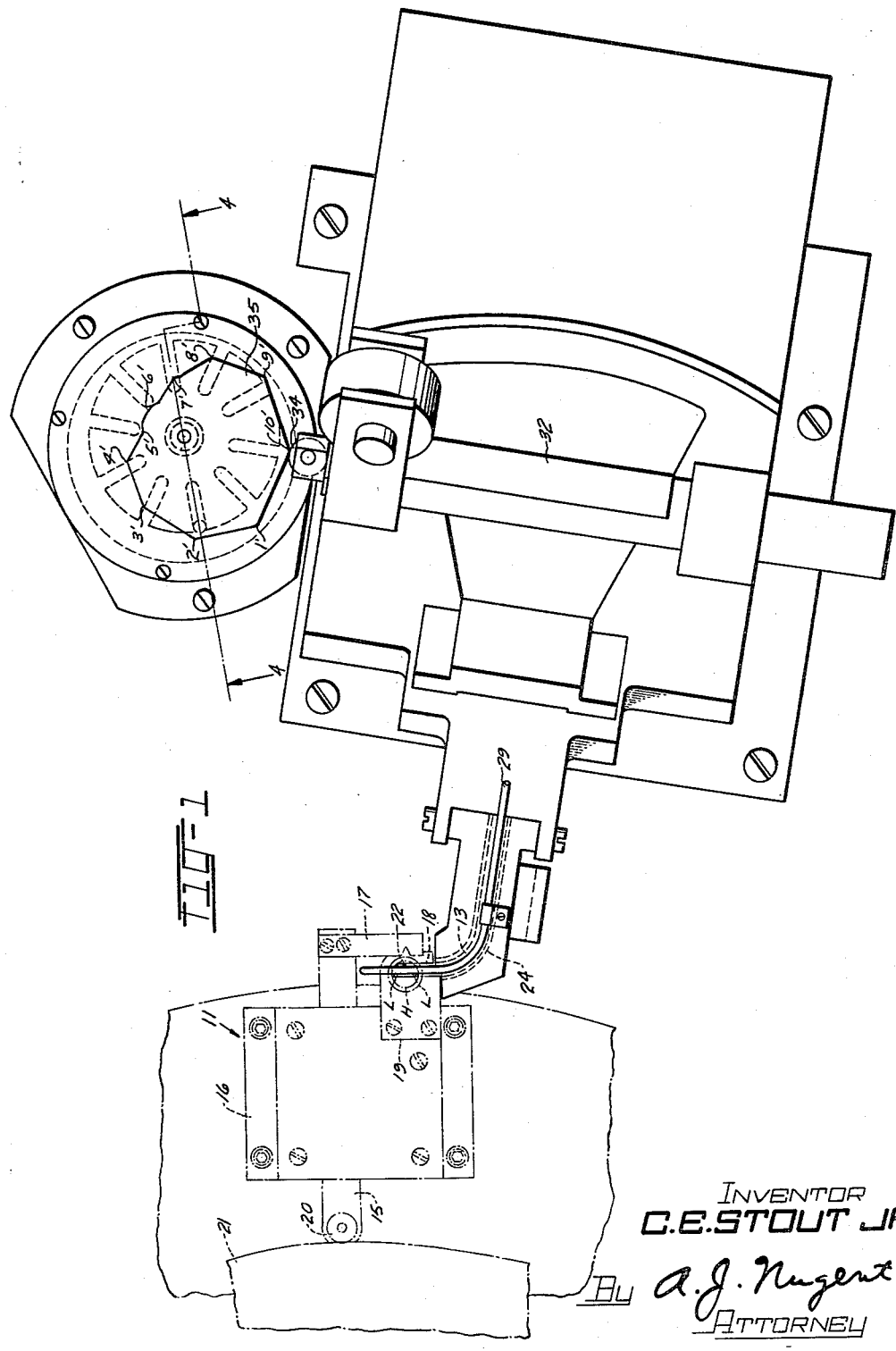
INVENTOR
C.E. STOUT JR.
By A.J. Nugent
ATTORNEY Jan. 21, 1964　　C. E. STOUT, JR　　3,118,528
ARTICLE UNLOADING MECHANISM
Filed Oct. 16, 1961　　4 Sheets-Sheet 2
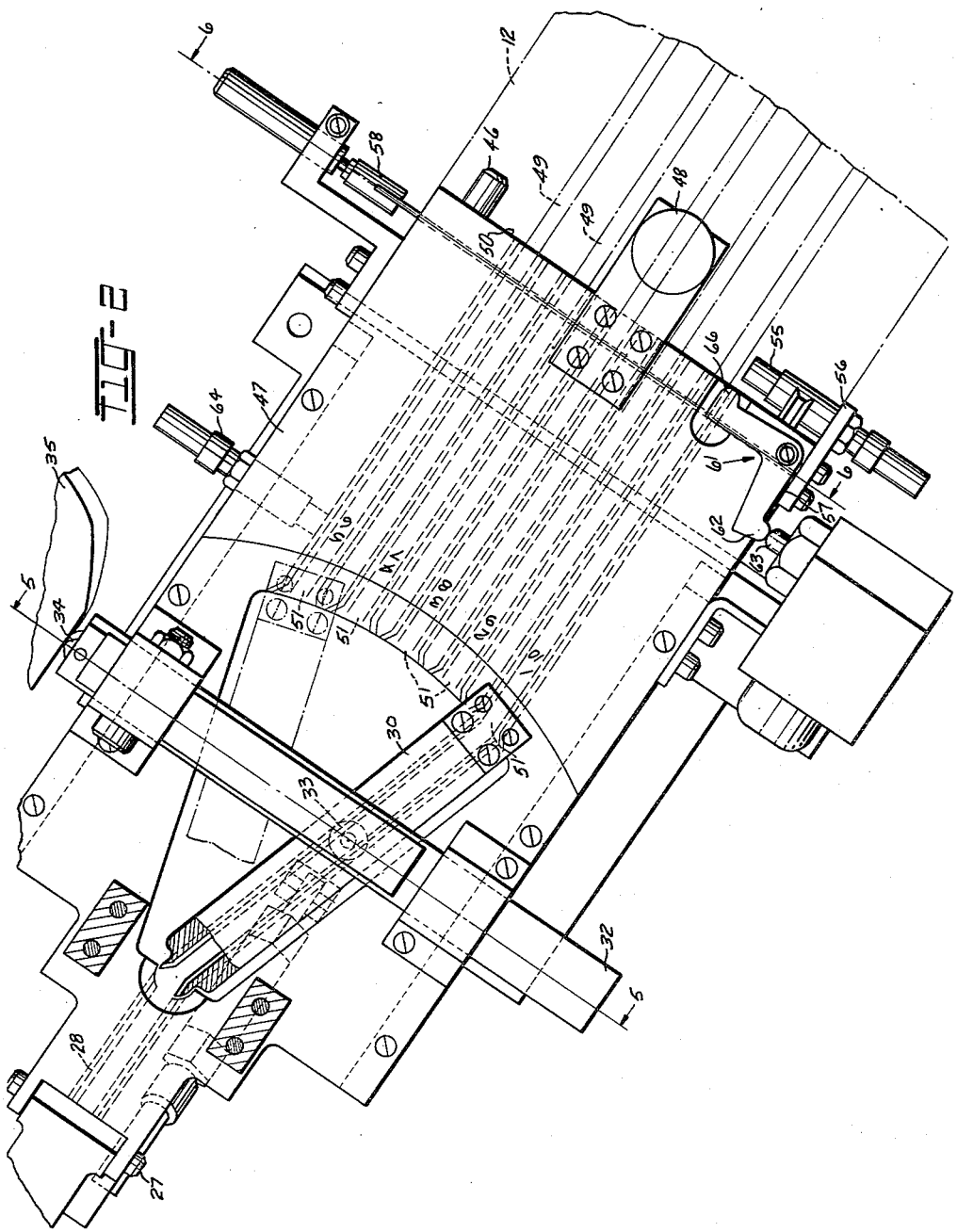
INVENTOR
C.E. STOUT JR.
By A.J. Nugent
ATTORNEY

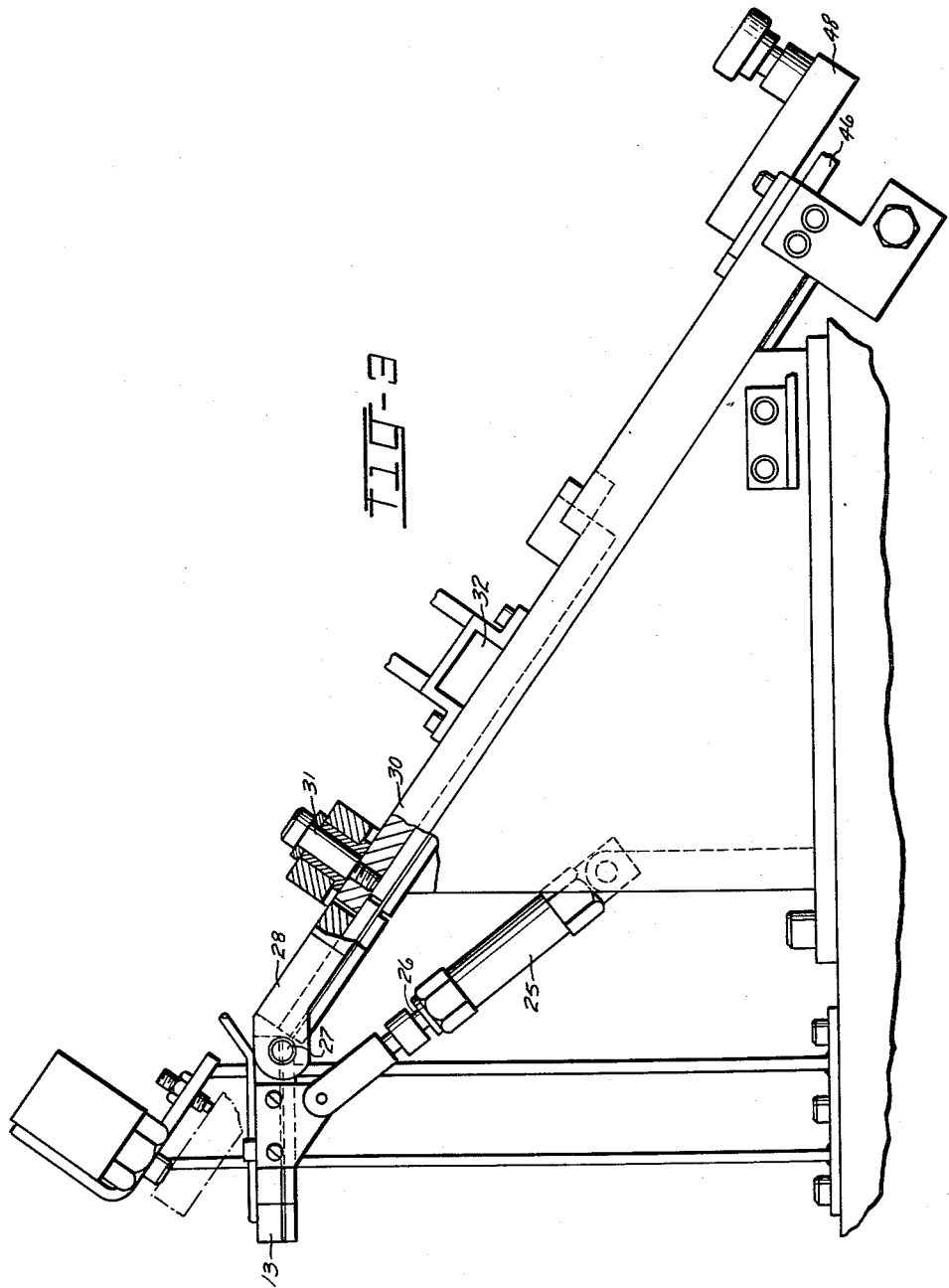

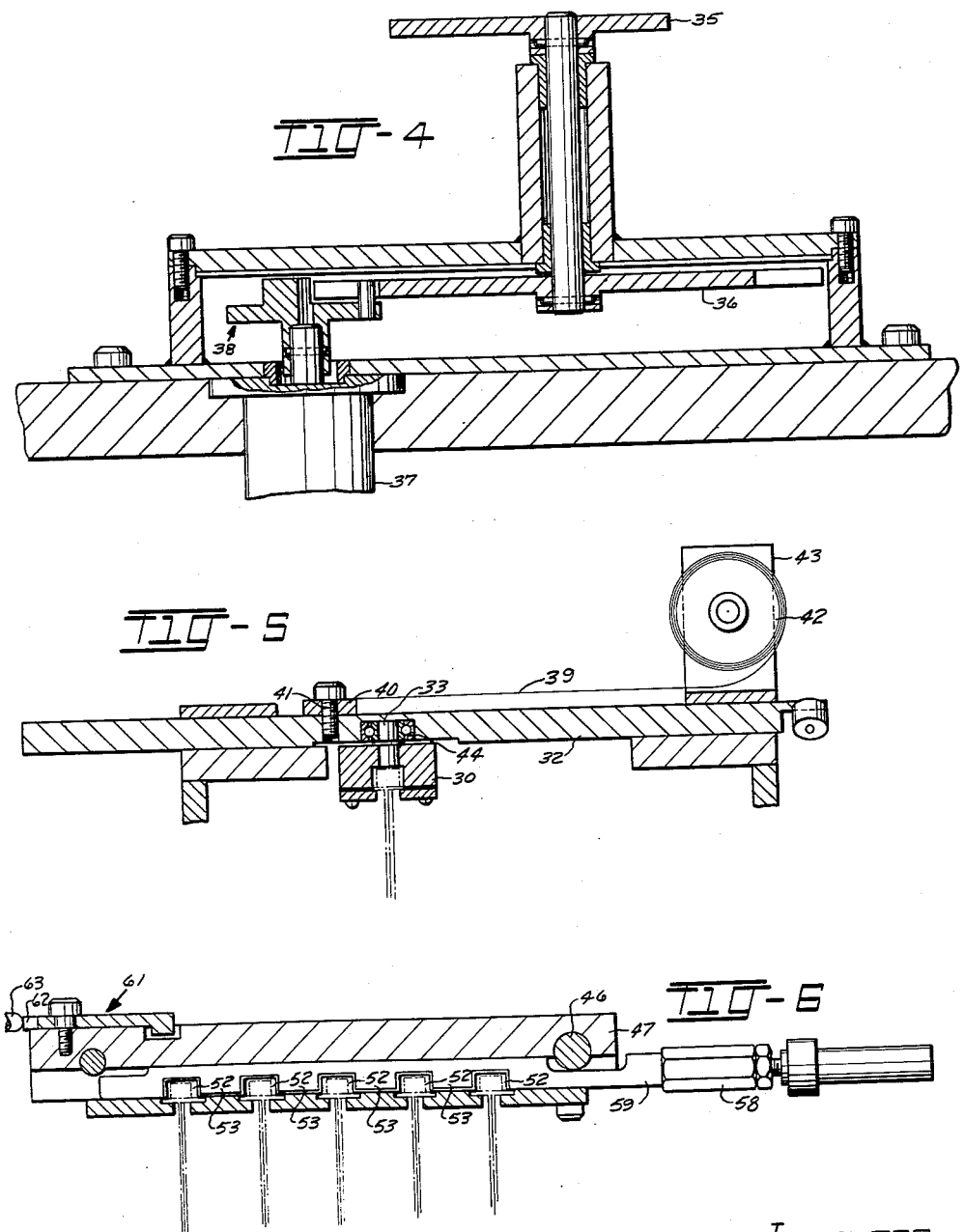

United States Patent Office 3,118,528
Patented Jan. 21, 1964

3,118,528
ARTICLE UNLOADING MECHANISM
Charles E. Stout, Jr., Allentown, Pa., assignor to Western Electric Company, Incorporated, New York, N.Y., a corporation of New York
Filed Oct. 16, 1961, Ser. No. 145,304
7 Claims. (Cl. 193—31)

This invention relates to transfer apparatus and particularly to an apparatus for transferring articles, such as transistor headers, from one workholder to another.

Transistor headers generally are comprised of a plurality of leads extending though and attached at one point to a cylindrical body portion which contains a semiconductive element, such as a germanium or silicon wafer, with numerous other connecting components thereto. The over-all configuration of the headers is such that some difficulties arise in handling them, for example, in transferring the headers from an assembly machine to a work storage rack which subsequently is used for feeding the headers to other apparatus in the further assembly of the headers.

Accordingly, the object of this invention is an apparatus for automatically transferring articles, such as transistor headers from individual workholders to predetermined receiving portions of a storage workholder.

In accordance with the invention in its broader aspects, upon the release of a header from an advancing workholder, means are provided for moving the header onto a transfer track. The header passes down the transfer track to a pivotally movable inclined distributor track which permits the headers to pass to successive receiving portions of a second workholder.

In a preferred embodiment of the invention, an air blast blows the header from a first workholder onto a transfer track which is pivoted upwardly to an inclined position substantially similar to an adjoining fixed intermediate track. The header passes down the transfer and intermediate tracks through a laterally reciprocating distributor track which is driven by a cam-operated distributor arm. The exit end of the distributor track registers with channels of a distributor body, the channels communicating with a second workholder for receiving the headers.

A feature of this invention is an automatically operable gate extending through the distributor body for storing succeeding headers therein during the removal of a loaded second workholder.

Other objects will be apparent and a fuller understanding of the invention may be had by referring to the following description and claims, taken in conjunction with the accompanying drawing, in which:

FIG. 1 is an over-all plan view of an advancing workholder in position for transferring a header to the transfer apparatus;

FIG. 2 is a plan view of a portion of the transfer apparatus;

FIG. 3 is a side view of the transfer apparatus;

FIG. 4 is a cross-sectional view taken along the line 4—4 of FIG. 1;

FIG. 5 is a cross-sectional view taken along line 5—5 of FIG. 2; and

FIG. 6 is a cross-sectional view taken along line 6—6 of FIG. 2.

Referring now to FIGS. 1 and 2 of the drawing, the invention is incorporated in apparatus for transferring an assembled header H from a jig 11 to a rack 12. The jig is mounted on a turret (not shown) which indexes the jig to a predetermined position with respect to a transfer track 13 for receiving the headers, the track being normally disposed in an inclined position, as seen in phantom in FIG. 3.

Jig 11 includes a spring-loaded reciprocatable lever 15 extending through and being supported within a housing 16. Lever 15 has a clamping element 17 at one end for holding a header in recess 18 of jig nest 19, a roller 20 being provided at the other end of lever 15. As the jig is indexed, the roller engages a stationary, arcuately shaped cam 21 which extends over the turret in the path of the jig causing the lever to advance and release its grip on header lead 22.

As seen in FIG. 3, an air cylinder 25, connected to transfer track 13, is deactivated after the lever release of header lead 22 causing piston rod 26 to retract. In turn, transfer track 13 is moved to a horizontal position in alignment with jig recess 18, track 13 pivoting about pin 27 which connects it to a stationary, inclined, intermediate track 28.

A jet of air is supplied to the right end of a tube 29 mounted on the transfer track 13 and emitted from the turned under left end of the tube to blow the header from jig recess 18 onto the transfer track, the header body being supported on the track rails 24 and the header leads L extending through the track opening. At this point, air cylinder 25 is actuated to extend piston rod 26 which pivotally moves transfer track about pin 27 to the same inclined position as intermediate track 28. In so doing, the header passes down tracks 13 and 28 by gravity feed into a distributor track 30 located at the exit end of track 28.

Distributor track 30 is pivotally connected near its entrance end to a pin 31, and to a distributor arm 32 by a stud 33 journaled in and movable within a grooved portion in distributor track 30 and bearing 44 (see FIGS. 3 and 5), the arm being disposed in a transverse relationship with respect to tracks 13, 28 and 30. Mounted at one end of the arm is a cam follower 34 for travel along a ten-point cam 35 which is driven by a ten-point Geneva 36 from a main gear shaft 37 through a Geneva drive unit 38 (see FIGS. 1 and 4). Constant spring tension is applied to the distributor arm by a spring 39 (see FIG. 5) whose end portion 40 is connected to the distributor arm 32 by a screw 41, the spring being fed from spool 42 mounted on support 43. Thus, upon the rotation of cam 35, distributor arm 32 is transversely reciprocated in an accurate manner; that is, the motion acting through stud 33 and bearing 44 to distributor track 30 causes said track to, in turn, pivot accurately about pin 31 thereby assuring alignment of the distributor track with each channel 51 in the distributor body 47, the movement of the distributor track being described in more detail hereinafter.

As seen in FIG. 2, a removable rack 12 is inserted over guide pins 46 extending from a distributor body 47 and locked thereto by latch 48, the body and rack each having five parallel channels, 1, 10; 2, 9; 3, 8; 4, 7; and 5, 6; the entrance end 49 of the rack channels communicating with the exit end 50 of the body channels. It is noted that each channel has two reference numerals for simplifying reference thereto in accordance with the ten-point positions 1' to 10' on cam 35 as hereinafter described. The entrance end portions 51 of each body channel are shaped to form an arcuate configuration so that when distributor track 30 is indexed, it will be in registration with each end portion 51 to feed a header therein. For example, when point 10' of cam 35 engages cam follower 34, the distributor track 30 communicates with channel 10 to permit a header to pass therethrough by gravity feed. Similarly, when point 9' of cam 35 engages cam follower 34, distributor track 30 communicates with groove 9 to receive a header. The distributor track continues to move to the right until it reaches channel 6, 5 whereupon it remains to drop two successive headers, as points 6' and 5' of the cam engage the cam follower.

The track then returns to the left successively depositing a header in channels 4, 3, 2 and then remaining at channel 1, 10 to deposit two successive headers therein. It is noted that the cam mechanism is so cycled that during the time a header is being transferred from jig recess 18 through tracks 13 and 28, the distributor track travels from one channel to the next in proper registry therewith. It is to be understood that while a ten-point cam 35 has been described in operating a distributor track for a five-channeled distributor body and rack, any multipoint cam and number of channels may be employed to gradually fill a rack in a uniform manner as herein-before described.

A proximity switch 55 is supported in a holding element 56 mounted on and extending from the end portion 57 of body 47, the switch extending towards one of the end channels; in this particular apparatus, channel 1, 10. The switch is of the conventional type having a time delay relay therein (not shown) so that when a header slides down the rack channel past the switch within a predetermined time, for example, one second, the passing header will be detected and the time delay relay will start and stop running within this time. In this manner, as the headers slide down the channel past the switch, insufficient time lapses to cause the delay relay to fully operate.

However, when channel 1, 10 is nearly filled, that is, a header is located just past the switch, the next header will strike the preceding header and stop in the detection area of the proximity switch. The time delay will run its maximum time to energize a conventional type signalling circuit (not shown) which sounds a signal bell to indicate the presence of a full rack. Simultaneously, as seen in FIGS. 2 and 6, an air cylinder 58 is activated to advance a gate 59 transversely to the left with respect to the distributor body channels 1 to 10. The gate has alternately spaced openings 52 whose configuration is similar to and in alignment with the body channels when in its normal retracted position, the openings being separated by block portions 53 for blocking the passage of the headers through the distributor body channels 1 to 10, when the gate is in the advanced position. Upon the removal of rack 12 from body 47, and L-shaped piovtal element 61 is pivoted clockwise. When the full rack is being removed, arm 62 of element 61 breaks contact with and closes a switch 63 which operates a solenoid valve (not shown) controlling air cylinder 58 to keep the gate closed. In this manner, the gate remains closed when no rack is in position thereby insuring that no headers will pass from the distributor body channels 1 to 10. Upon the insertion of an empty rack 12 onto the distributor body 47, the rack engages arm 66 of element 61 causing it to pivot counterclockwise. Arm 62 engages and opens switch 63 thereby de-energizing the solenoid valve which, in turn, causes cylinder 58 to retract and open gate 59. Subsequently, the stored headers in body 47 slide into the rack channels.

In the event an operator does not remove the loaded rack from the apparatus, the passage of succeeding headers will be retained within the distributor body channels since the distributor track and assembly machine continue to operate. Thus, the headers will continue to build up within the body channels until they reach a point whereby they are in the detection area of a second proximity switch 64 which is mounted on and extends from body 47 towards the upper portion of channel 6, 5. Switch 64 operates a time delay relay (not shown), similar to switch 55, to energize a conventional stop circuit (not shown) to stop the apparatus and thereby prevent an overloading of the body channels and possible jam of the distributor track.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. Apparatus for transferring articles from a first workholder to a second workholder and uniformly loading the articles in a plurality of receiving portions disposed in the second workholder, which comprises:
  a transfer track pivotally movable between a raised and lowered position,
  an inclined distributor track pivotally movable about a vertical axis and having one end communicating with the transfer track and the other end communicating with the second workholder,
  means for moving an article from the first workholder to the transfer track in its lowered position,
  means for moving the transfer track to its raised position such that it is at an incline substantially similar to the distributor track to cause the article to pass down the tracks, and
  means for intermittently moving the distributor track into registration with each receiving portion in a manner such that all of the receiving portions receive an equal amount of articles.

2. Apparatus according to claim 1 in which the distributor track has a grooved portion extending longitudinally therein and the distributor track moving means comprises a distributor arm extending transversely with respect to the longitudinal axis of the distributor track,
  stud means connecting the arm to and being slidable within the grooved portion, and
  a cam intermittently movable for driving the arm to move the distributor track into registration with each receiving portion of the second workholder in a manner such that all of the receiving portions receive an equal amount of articles.

3. Apparatus according to claim 2 in which the cam is driven intermittently by a geneva drive and is shaped so as to permit two headers to successively drop in each outer receiving portion of the second workholder to uniformly load the second workholder with articles.

4. Apparatus for transferring articles from a first workholder to a second workholder and loading a predetermined amount of articles into each of a plurality of receiving portions disposed in the second workholder, which comprises:
  a transfer track pivotally movable between a raised and lowered position,
  an inclined distributor track pivotally movable about a vertical axis and having one end communicating with the transfer track and the other end communicating with the second workholder,
  means for moving an article from the first workholder to the transfer track in its lowered position,
  means for moving the transfer track to its raised position such that it is at an incline substantially similar to the distributor track to cause the article to pass down the tracks,
  means for intermittently moving the distributor track into registration with each receiving portion in a manner such that all of the receiving portions receive an equal amount of articles,
  means for sensing when all of the receiving portions have received the same predetermined amount of articles, and
  means responsive to operation of the sensing means for impeding the flow of articles to the second workholder to thereby assure accurate loading thereof.

5. Apparatus for transferring articles from a first workholder to a second workholder and loading a predetermined amount of articles into each of a plurality of receiving portions disposed in the second workholder, which comprises:
  a transfer track pivotally movable between a raised and lowered position,
  a distributor body having a plurality of channels therein,
  an inclined distributor track pivotally connected to the distributor body for movement about a vertical axis and having one end communicating with the transfer track and the other end communicating with the entrance end portions of the body channels, means for moving an article from the first workholder to the transfer track in its lowered position, means for moving the transfer track to its raised position such that it is at an incline substantially similar to the distributor track to cause the article to pass down the tracks, means for intermittently moving the distributor track into registration with each receiving portion in a manner such that all of the receiving portions receive an equal amount of articles, a gate extending transversely through the body channels and operable between retracted and advanced positions, the gate having openings therein whose configuration is similar to and in alignment with the body channels when in the retracted position, a first proximity detection switch adjacently disposed near the entrance end portions of the second workholder and operative to detect the presence of a loaded second workholder, and means responsive to the operation of the switch for extending the gate to its advanced position for storing succeeding articles in the body channels after loading of the second workholder.

6. Apparatus according to claim 5 in which a second proximity switch is adjacently disposed near the entrance end portions of the body channels and operative for detecting the presence of a partially loaded body, and means responsive to the operation of the switch for stopping the apparatus.

7. Apparatus for transferring articles from a first workholder to a second workholder and loading a predetermined amount of articles into each of a plurality of receiving portions disposed in the second workholder, which comprises:

a transfer track pivotally movable between a raised and lowered position, a stationary inclined track pivotally connected at one end to the transfer track, a distributor body having a plurality of channels therein, each channel end portion communicating with the entrance end receiving portion of the second workholder, an inclined distributor track pivotally connected to the body for movement about a vertical axis and having one end communicating with the stationary track and the other end communicating with the entrance end portions of the body channel, means for moving an article from the first workholder to the transfer track in its lowered position, means for moving the transfer track to its raised position such that it is at an incline substantially similar to the stationary and distributor tracks to cause the article to pass down the tracks, a distributor arm extending transversely with respect to the longitudinal axis of the distributor track and having a grooved portion extending longitudinally therein, stud means connecting the arm to and being slidable within the grooved portion, a cam intermittently movable for driving the arm to move the distributor track into registration with each receiving portion of the second workholder in a manner such that all of the receiving portions receive an equal amount of articles, a gate extending transversely through the body channels and operable between retracted and advanced positions, the gate having openings therein whose configuration is similar to and in alignment with the body channels when in the retracted position, a first proximity detection switch adjacently disposed near the entrance end portions of the second workholder and operative to detect the presence of a loaded second workholder, means responsive to the operation of the switch for extending the gate to its advanced position for storing succeeding articles in the body channels after loading of the second workholder, a second proximity switch adjacently disposed near the entrance end portions of the body channels and operative for detecting the presence of a partially loaded body, and means responsive to the operation of the switch for stopping the apparatus.

References Cited in the file of this patent
UNITED STATES PATENTS

| | | |
|---|---|---|
| 789,135 | Baggaley | May 9, 1905 |
| 2,615,555 | Carter | Oct. 28, 1952 |
| 2,799,378 | English | July 16, 1957 |
| 2,865,578 | Hennessy | Dec. 23, 1958 |
| 3,026,990 | Rayborn et al. | Mar. 27, 1962 |

UNITED STATES PATENT OFFICE
CERTIFICATE OF CORRECTION

Patent No. 3,118,528　　　　　　　　　　　　　　January 21, 1964

Charles E. Stout, Jr.

It is hereby certified that error appears in the above numbered patent requiring correction and that the said Letters Patent should read as corrected below.

Column 2, line 31, strike out "journaled in and"; same column 2, line 32, after "and" insert -- journaled in --.

Signed and sealed this 30th day of June 1964.

(SEAL)
Attest:

ERNEST W. SWIDER
Attesting Officer

EDWARD J. BRENNER
Commissioner of Patents